US007009661B2

(12) United States Patent
Sato

(10) Patent No.: US 7,009,661 B2
(45) Date of Patent: Mar. 7, 2006

(54) VIDEO SIGNAL DETECTING CIRCUIT FOR ADJUSTING SYNC SIGNALS WITH A MEAN DIFFERENCE OF THE NUMBER OF PIXELS FROM A STANDARD

(75) Inventor: Yasunori Sato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 749 days.

(21) Appl. No.: 10/190,832

(22) Filed: Jul. 9, 2002

(65) Prior Publication Data

US 2003/0107673 A1 Jun. 12, 2003

(30) Foreign Application Priority Data

Dec. 12, 2001 (JP) ............................ 2001-378264

(51) Int. Cl.
*H04N 5/14* (2006.01)

(52) U.S. Cl. ....................... 348/558; 348/526; 348/529

(58) Field of Classification Search ................ 348/558, 348/554, 555, 529, 526; 345/600, 204, 242
See application file for complete search history.

(56) References Cited

U.S. PATENT DOCUMENTS 5,872,601 A * 2/1999 Seitz .......................... 348/558
6,130,721 A * 10/2000 Yoo et al. ................... 348/558
6,275,264 B1 * 8/2001 Kim ........................... 348/525
6,366,327 B1 * 4/2002 Renner et al. ............. 348/558
6,545,725 B1 * 4/2003 Fujita et al. ............... 348/604
6,795,124 B1 * 9/2004 Gamo et al. ................ 348/525

FOREIGN PATENT DOCUMENTS

JP 11341304 12/1999

* cited by examiner

*Primary Examiner*—Brian Yenke
*Assistant Examiner*—Trang U. Tran
(74) *Attorney, Agent, or Firm*—Rabin & Berdo, P.C.

(57) ABSTRACT

A video signal detecting circuit includes a synchronization detector for detecting a vertical synchronous signal in an input video signal. A counter starts counting pixel clock pulses in response to every vertical synchronous signal thus detected, and outputs a first signal when the count of pixel clock pulses reaches a preselected value. A comparator compares the vertical synchronous signal detected with the first signal for outputting a second signal representative of a difference between them. A mean circuit produces a mean value of the second signals over a plurality of pictures of the input video signal. An adjusting circuit adjusts the vertical synchronous signal with the mean value to output the resultant adjusted signal as a vertical synchronous signal. The preselected number is substantially equal to the standard number of pixels included in a single picture.

9 Claims, 3 Drawing Sheets

VIDEO SIGNAL DETECTING CIRCUIT FOR ADJUSTING SYNC SIGNALS WITH A MEAN DIFFERENCE OF THE NUMBER OF PIXELS FROM A STANDARD

BACKGROUND OF THE INVENTION

1. Field of the Invention

The present invention relates to a video signal decoder and more particularly to a video signal detecting circuit for detecting synchronous signals included in a video signal.

2. Description of the Background Art

Generally, a circuit for detecting a TV (television) or similar video signal is sometimes supplied with a video signal having a format other than the NTSC (National Television System Committee) or similar standard format or sometimes with no video signals. Such a video signal detecting circuit must generate vertical synchronous signals at adequate timing without regard to the format of the input video signal or even when no video signals are input.

Japanese patent laid-open publication No. 341304/1999 discloses a video signal detecting circuit that is a partial solution to the above problem. The video detecting circuit taught in this document distinguishes three different modes of an input video signal from each other and generates vertical synchronous signals in a particular manner for each mode. More specifically, in a first mode in which the circuit receives a standard format of video signal, it decodes vertical synchronous signals with a line counter. In a second mode in which the circuit receives a video signal other than the standard format of video signal, it detects vertical synchronous signals without using the line counter while outputting the signals. Further, in a third mode in which the circuit receives no video signals, it outputs vertical synchronous signals in a free-running fashion to cause a blank screen to be displayed.

The video signal detecting circuit taught in the above-mentioned laid-open publication has some problems left unsolved, as will be described hereinafter. Generally, so long as an input video signal has a standard or a nearly standard format, the number of horizontal scanning lines changes little. Also, with a video signal having a format other than the standard format, the horizontal scanning lines may accurately be counted. In such a condition, the video detecting circuit disclosed by the aforementioned Japanese publication automatically selects the first mode or standard mode in order to accurately decode the video signal. Pictures represented by the decoded video signal will appear natural to eye when displayed on a video monitor.

However, pictures are sometimes lowered in quality when displayed on a video monitor. This is because even when the number of horizontal scanning lines meets the standard, the number of pixels included in each of the horizontal scanning lines is sometimes not constant. As for the NTSC standard, for example, ITU601 prescribes that the number of pixels for a single scanning line should be 858. In this case, if one line has 857 pixels while another line has 859 pixels by way of example, then the vertical edge of a picture area is viewed jagged or the vertical lines shown in a picture are viewed zigzag, resulting in low picture quality.

As for the first mode, the video signal detecting circuit disclosed in the Japanese publication counts horizontal scanning lines with the line counter to thereby decode vertical synchronous signals, as stated earlier. However, under the above-stated situation in which the number of pixels for a single horizontal scanning line does not meet the standard although the number of scanning lines for a single picture meets it, it is likely that the vertical synchronous signals derived from the count of the line counter are not coincident in timing with the vertical synchronous signals included in the input video signal. This prevents the video signal from being accurately decoded.

Further, with the video signal detecting circuit disclosed by the Japanese publication, a free-running function is available with no signals received, and assigned to the third mode or start mode. The free-running function, however, cannot distinguish a condition where a video signal is not input due to the disconnection of a cable from a condition where a video signal is input but cannot be decoded due to excessive noise.

SUMMARY OF THE INVENTION

It is an object of the present invention to provide a video signal detecting circuit capable of generating vertical synchronous signals at adequate timing even when the number of pixels of an input video signal forming a single picture is different from a standard number.

In accordance with the present invention, a video signal detecting circuit includes a synchronization detector for detecting a vertical synchronous signal in an input video signal. A counter starts counting pixel clock pulses in response to every vertical synchronous signal detected by the synchronization detector, and outputs a first signal when the count of pixel clock pulses reaches a preselected value. A comparator compares the vertical synchronous signal detected with the first signal for outputting a second signal representative of a difference between them. A mean circuit averages the second signals over a plurality of pictures of the input video signals, and produces a mean value from averaging. An adjusting circuit adjusts the vertical synchronous signal with the mean value and outputs the resultant adjusted signal as a vertical synchronous signal. The preselected number is substantially equal to the standard number of pixels included in a single picture.

Also, in accordance with the present invention, a video signal detecting circuit includes a synchronization detector for detecting a vertical and a horizontal synchronous signal in an input video signal. A first counter starts incrementing in response to the vertical synchronous signal detected to output a first signal representative of an incrementing value, and stops incrementing when the count reaches a first preselected value. A second counter starts incrementing in response to the horizontal synchronous signal following the vertical synchronous signal detected, and counts horizontal synchronous signals to output a second signal representative of a count. A first comparator compares the second signal with the first signal for outputting a third signal representative of a difference between them. A third counter starts counting pixel clock pulses in response to every horizontal synchronous signal detected, and outputs a fourth signal when a count reaches a second preselected value. A second comparator compares the horizontal synchronous signal detected with the fourth signal for outputting a fifth signal representative of a difference between them. A mean circuit averages the fifth signals over a plurality of lines of the input video signal to produce a mean value resultant from averaging. An adjusting circuit adjusts the detected horizontal synchronous signal with the mean value for outputting the resulting adjusted signal as a horizontal synchronous signal. The first and second preselected counts are respectively substantially equal to a standard number of lines included in a single picture and a standard number of pixels included in a single line.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
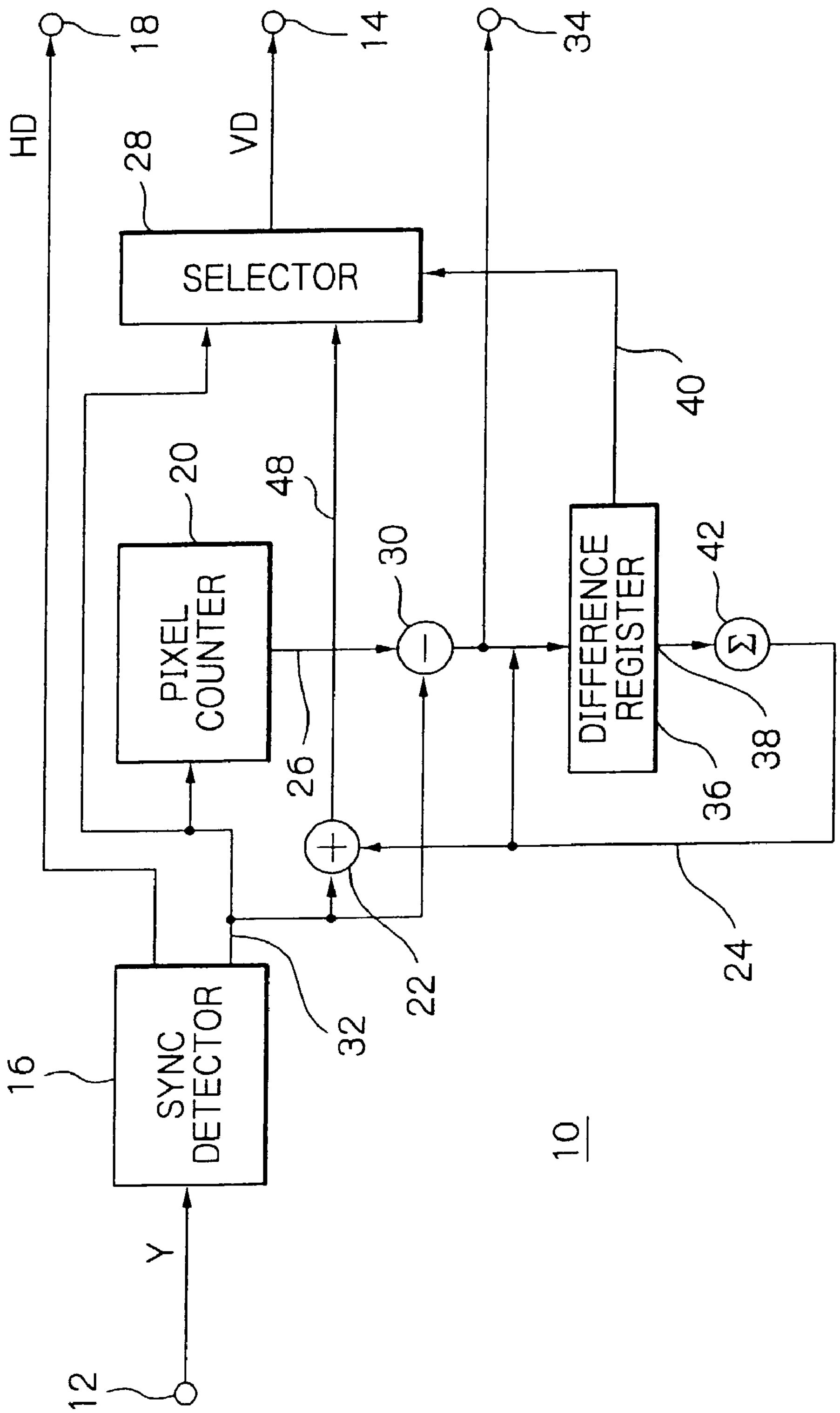
FIG. 1 is a schematic block diagram showing a preferred embodiment of the video signal detecting circuit in accordance with the present invention.

Referring to FIG. 1 of the accompanying drawings, a video signal detecting circuit in accordance with an illustrative embodiment of the present invention, generally designated with a reference numeral 10, is adapted to receive a luminance signal Y on its input terminal 12 and generate therefrom a vertical synchronous signal VD at an appropriate timing to develop the latter on its output terminal 14. To the input terminal 12, in the illustrative embodiment, applied is a luminance signal Y obtained from a color video signal by separating color difference signals from the color video signal in the form of digital data. The original color video signal may be of any format, e.g. the NTSC (National Television System Committee) standard or the PAL (Phase Alternation by Line) standard. Further, the color video signal may be either of a field-interlace system in which a couple of fields are interlaced with each other for forming a single frame or a non-interlace system in which a single frame is formed with a single field. To the output terminal 14 of the detecting circuit 10, connected is a utility circuit such as a video monitor, not shown.

The input terminal 12 is connected to an input port of a synchronization (SYNC) detector 16. The synchronization detector 16 is adapted to detect vertical and horizontal synchronous signals included in the luminance signal Y. More specifically, when the luminance signal Y remains at a level below a predetermined threshold level for more than a preselected period of time, the synchronization detector 16 determines that such a low-level portion of the luminance signal Y is a vertical synchronous signal. The synchronization detector 16 produces the result of decision on its output terminal 32 in the form of a vertical synchronization detection pulse. The output terminal 32 is connected to an input of a binary pixel counter 20. Further, the synchronization detector 16 detects a horizontal synchronous signal in the same manner as with the vertical synchronous signal, and directly outputs it to the utility circuit on its output terminal 18.

The pixel counter 20 is responsive to the vertical synchronization detection pulse to start counting self-running pixel clocks. When a count of the pixel clock pulses reaches a preselected upper limit, the pixel counter 20 produces a vertical synchronizing pulse on its output 26 while resetting itself to its initial state. In order to enable the pixel counter 20 to count pixels, the pixel clock pulses have a frequency substantially equal to the pixel rate of the luminance signal Y. The upper limit is selected to be equal to the total number of pixels constituting a single field or frame, i.e. a single frame of picture. The pixel counter 20 has an output 26 connected to one input of a comparator 30. It is to be noted that in the following description signals are designated by reference numerals attached to connection lines on which they appear.

The comparator 30 has its another input port connected to the output 32 of the synchronization detector 16. In FIG. 1, the comparator 30 is simply represented by a symbol "–" showing a subtractor. In practice, the comparator 30 is adapted to determine a duration over which the vertical synchronizing pulse fed from the pixel counter 20 overlaps the actual vertical synchronization detection pulse fed from the synchronization detector 16 to produce a numerical value representative of the overlapping duration in terms of the number of pixel clock pulses on its output 34. The numerical value therefore shows a difference of the actual number of pixels on a horizontal scanning line from a reference number of pixels, i.e., the error of the number of pixels constituting a single field or frame with respect to a reference number of pixels. The output 34 is used as a flag representing "non-standard." The output 34 of the comparator 30 is input to a difference register 36 as well.

The difference register 36 functions as a memory for temporarily storing the difference 34 input from the comparator 30. The difference register 36 includes two register circuits although not shown specifically. One register circuit is adapted for storing n (natural number) differences with a FIFO (First-In First-Out) principle while the other register circuit is for storing a mean value, which will be described later. More specifically, each register circuit is adapted to hold differences which have been fed from the comparator 30 over a period of time corresponding to past n field or frame periods as counted from the current time. The difference register 36 has outputs 38 and 40 connected to a mean circuit 42 and the control input of a selector 28, respectively.

The mean circuit 42 is adapted for producing a result of calculation on its output terminal 24, which is connected on one hand to one input of an adder 22 and on the other hand to the input of the difference register 36. In FIG. 1, the mean circuit 42 is simply represented by a symbol "Ó" showing a summing circuit. In practice, the mean circuit 42 includes an adder and a divider although not shown specifically. The adder adds the differences to each other output from the difference register 36 over past n field or frame periods. The divider produces a mean value of the resulting sum with respect to n times. The mean value appears on the output 24.

The adder 22 has its another input connected to the output 32 from the synchronization detector 16. The adder 22 functions as an adjusting circuit for adding the vertical synchronization detection pulse 32 output from the synchronization detector 16 to the mean value 24 output from the mean circuit 42 to produce the resulting sum on its output 48. In a broad sense, the term "addition" includes subtraction also. For example, the adder 22 performs addition or subtraction if the mean value 24 is positive or negative, respectively. While the adder 22 is simply represented by a symbol "+" showing an adder, it may be adapted to delay (when adding) or advances (when subtracting) the vertical synchronization detection pulse 32 by a period of time corresponding to the mean value 24. The adder 22 has its output 48 connected to one input of the selector 28.

The selector 28 has its another input connected to the output 32 of the synchronization detector 16. The selector 28 is adapted to select either one of the two inputs 32 and 48 to connect the selected one to the circuit output port 14 in response to the signal received on its control input 40 from the difference register 36. More specifically, monitoring the output 40 from the difference register 36, the selector 28 selects the output 48 of the adder 22 if the output 40 is zero or lies in a preselected allowable range around zero. Otherwise, the selector 28 selects the output 32 from the synchronization detector 16. The signal 48 or 32 selected appears on the output 14 as a vertical synchronous signal VD.

The preselected, allowable range is selected such as to prevent the vertical synchronizing pulse from noticeably deviating from a standard vertical synchronous period to make a period to be adjusted excessively long. It is to be noted that the selector 28 may be omitted in an application in which the output 48 of the adder 22 is used as the vertical synchronous signal VD even when the vertical synchronizing pulse noticeably deviates from the standard in period. In such a case, the output 48 of the adder 22 will be directly connected to the output 14.

In operation, when the luminance signal Y applied to the input terminal 12 remains below the preselected threshold level over a preselected period of time, the synchronization detector 16 recognizes the portion of the luminance signal Y below the threshold level as a vertical synchronous signal, and feeds a vertical synchronization detection pulse to the pixel counter 20 from its output 32. In response, the pixel counter 20 starts counting pixel clock pulses. When the count of pixel clocks reaches the preselected upper limit, the pixel counter 20 feeds a vertical synchronizing pulse to the comparator 30 from its output 26. At the same time, the pixel counter 20 resets itself and again starts counting pixel clock pulses.

The synchronization detector 16 consecutively delivers the horizontal synchronous signal HD detected also to its other output 18. In addition, the vertical synchronization detection pulse 32 is also fed to the other input to the comparator 30, which in turn determines a period of time over which the vertical synchronizing pulse output from the pixel counter 20 overlaps the actual vertical synchronous signal coming from the synchronization detector 16. The comparator 30 then feeds a signal representing the thus determined period of time to the difference register 36 from its output 34 in the form of the number of pixel clock pulses. The output 34 of the comparator 30 is also delivered to the utility circuit as a non-standard flag representative of the error of the number of pixels which constitute one field or frame from the reference value. The difference 34 is, of course, positive, negative or zero, and will be held in the difference register 36.

The difference register 36 stores in the FIFO fashion differences sequentially fed from the comparator 30 over a period of time corresponding to past n field or frame periods as counted from the current time. The mean circuit 42 sums up the n fields or frames of differences stored in the difference register 36, and then divides the resulting sum by a factor of n, thereby producing a mean value. The mean value, which is negative, positive or zero, is on one hand fed back to the difference register 36 to be temporarily stored therein, and on the other hand to one input of the adder 22 as well. If the mean value is positive or zero, then the adder 22 adds the mean value to the vertical synchronization detection pulse 32 received from the synchronization detector 16. If the mean value is negative, then the adder 22 subtracts it from the detection pulse 32. The result of addition or subtraction is fed to the selector 28 from the output 48 of the adder 22.

The selector 28 receives the vertical synchronous pulses 18 from the output 32 of the synchronization detector 16. The selector 28 connects either one of the output 48 of the adder 22 and the output 32 of the synchronization detector 16 to the device output port 14 in response to signals supplied to its control input 40 from the difference register 36. More specifically, when the output 40 of the difference register 36 is zero or lies in the allowable range around zero, the selector 28 selects the output 48 of the difference register 36 and transfers it to the output 14. On the other hand, when the output 40 does not lie in the allowable range, i.e., it is noticeably deviated from the standard vertical synchronizing period to make the adjustment period excessively long, the selector 28 selects the output 48 of the synchronization detector 16, i.e. the actual vertical synchronous signal.

Even more specifically, if the total number of pixels included in one field or frame period of the luminance signal Y arriving at the terminal 12 is equal to the number particular to the standard format or lies in its allowable range, that is, if the total number of pixels is substantially equal to the upper limit set in the pixel counter 20, then the mean value of differences produced by the difference register 36 and the mean circuit 42 is substantially zero. In this condition, the mean value stored in the difference register 36 is substantially zero. The selector 28 therefore transfers the output 48 of the adder 22 to the output terminal 14 in response to the control signal 40. Consequently, the vertical synchronous signal matching with the standard format is delivered from the adder 22 to the utility circuit, such as a video monitor, not shown, via the output terminal 14.

Alternatively, the selector 28 may be configured to feed the output 32 of the synchronization detector 16 to the output terminal 14 in the substantially standard condition described above. In such a case, the vertical synchronous signal with the substantially standard format detected by the synchronization detector 16 will appear on the output 14.

Well, when the total number of pixels included in one field or frame period of the luminance signal Y does not lie in the allowable range, that is, when the total number of pixels is below or above the upper limit set in the pixel counter 20 with a predetermined tolerance, the mean value of differences produced by the difference register 36 and the mean circuit 42 is a positive or a negative significant value other than zero. This significant value is fed from the output 24 of the mean circuit 42 to the adder 22. The adder 22 in turn adds the mean value 24 to the vertical synchronization detection pulse 32 output from the synchronization detector 16 or, if the mean value 24 is negative, subtracts it from the detection pulse 32. As a result, the adder 22 delays the detection pule 32 in the case of addition or advances it in the case of subtraction.

The delay or advance of the vertical synchronization detection pulse 32 means that the mean value stored in the differential register 36 is a significant value substantially not zero, but lying in a range in which the deviation is adjustable. The selector 28 therefore transfers the output 48 of the adder 22 to the output 14 in response to the control input 40 representative of that state. In this manner, on the output 14, appears the vertical synchronous signal VD corresponding to the result from the addition or subtraction made by the adder 22. Stated another way, the utility circuit connected to the output 14 receives the vertical synchronous signal VD at adequate timing even when the total number of pixels included in one field or frame period of the video signal does not lie in the predetermined range in which the deviation is allowable.

If the vertical synchronizing pulse is noticeably deviated from the standard vertical synchronizing period, i.e., does not lie in the allowable range to make the adjustment period excessively long, then, in the illustrative embodiment, the selector 28 selects the output 32 of the synchronization detector 16 in response to the control input 40 and transfers it to the output 14. Again, the comparator 30 outputs the significant non-standard flag on its output 34.

As stated above, with the embodiment of video signal detecting circuit 10, an input video signal in which the number of the lines constituting one field or frame meets the standard but the total number of pixels in the field or frame does not can be adjusted in terms of the fluctuation in period of the vertical synchronous signals so that vertical synchronous signals are successfully generated at adequate timing.

Figure 2:
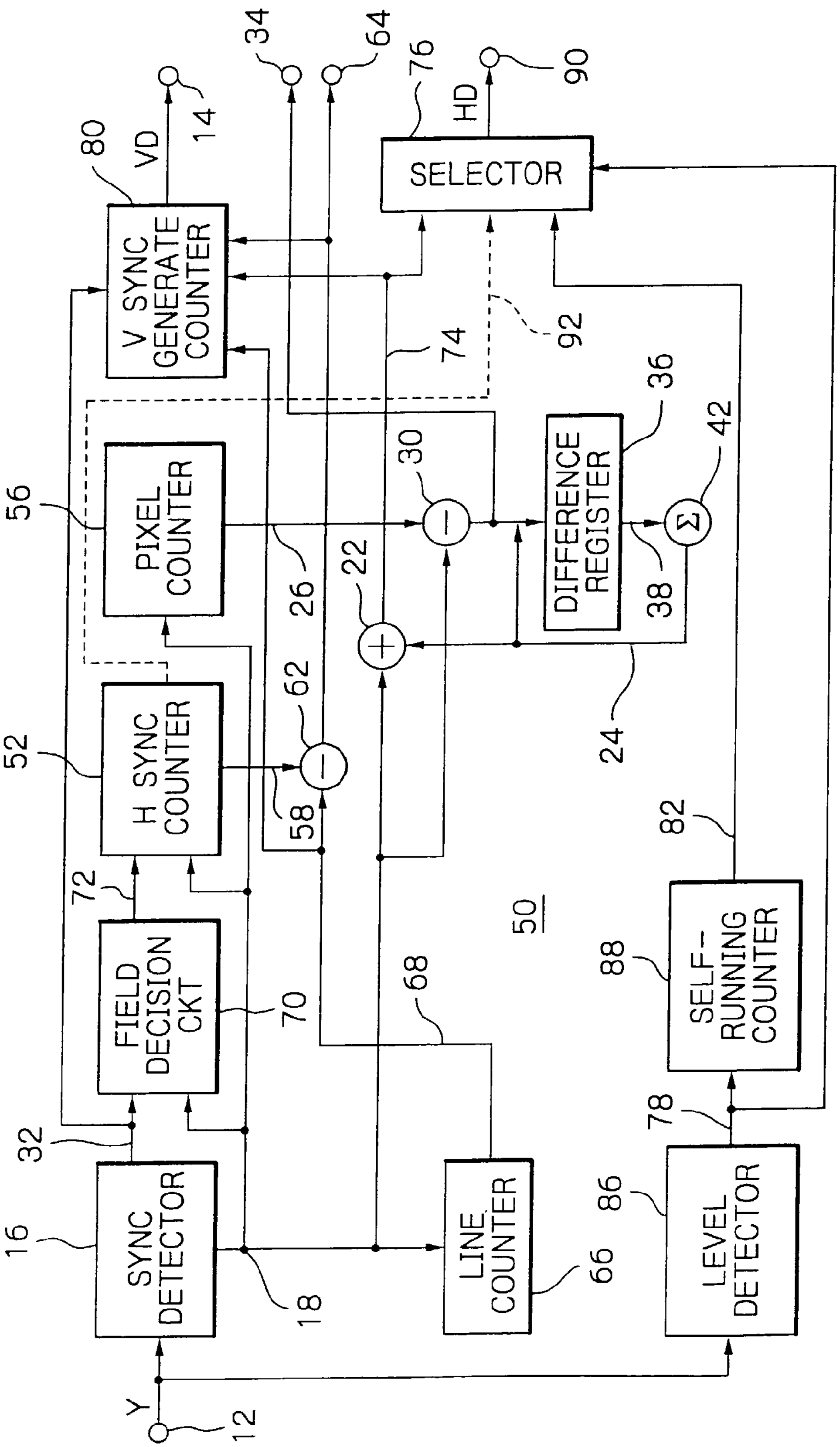
FIG. 2 is a schematic block diagram showing an alternative embodiment of the present invention.

Reference will now be made to FIG. 2 for describing an alternative embodiment of a video signal detecting circuit, generally 50, in accordance with the invention. Briefly, the video signal detecting circuit 50 is constructed to count pixels on the individual horizontal scanning line to adjust the number of pixels on the line to preselected one, and also to count horizontal scanning lines included in one frame or field, i.e. one picture to generate adequate vertical and horizontal synchronous signals in dependent upon whether or not the input video signal has a standard format. In FIG. 2, blocks and connection lines like those of the previous embodiment are designated by identical reference numerals and will not be described specifically in order to avoid redundancy.

As shown in FIG. 2, a video signal detecting circuit, generally 50, includes a horizontal synchronization (H SYNC) counter 52. The horizontal detection counter 52 has its input connected to receive the horizontal synchronization detection signal 18 from the synchronization detector 16. The horizontal synchronization counter 52 is a self-running binary counter that is adapted to increment every standard horizontal scanning period (1H). More specifically, the counter 52 starts incrementing in response to the first horizontal synchronous signal included in one frame or field, which is derived from the output 18 of the synchronization detector 16. The counter 52 resets itself to the initial state when its count reaches a preselected upper limit. The upper limit is set to be equal to the number of horizontal scanning lines included in one frame or field of the standard video signal format. The upper limit is set in the counter 52 via its output 72 by a field decision circuit 70. The counter 52 has its output 58 interconnected to one input of a comparator 62.

The field decision circuit 70 is adapted to receive the horizontal and vertical synchronization detection pulses 18 and 32 output from the synchronization detector 16 to determine, when the input video signal 12 is field-interlaced, whether the current field is an odd- or even-numbered field. In the illustrative embodiment, the field decision circuit 70 makes this decision on the basis of the beginning of the vertical and horizontal synchronous signals. Basically, the field decision circuit 70 determines that the current field is odd or even if the vertical and horizontal synchronous signals simultaneously appear on its input 32 or are shifted from each other by about a ½H period, respectively. This decision principle will be described more specifically later.

For example, if the field decision circuit 70 determines the current field as odd one, it then sets in the horizontal synchronization counter 52 via its output 72 a value equal to the number of horizontal scanning lines included in one field of standard format as the previously mentioned upper limit. If the current field is determined as an even field, then in the horizontal synchronization counter 52 set is a value equal to one-half of the number of scanning lines included in one field of the standard format as the upper limit for the first horizontal scanning line, while another value equal to the number of field scanning lines of the standard format is set for the second and successive horizontal scanning lines.

The horizontal synchronization detection pulse 18 output from the synchronization detector 16 is input to a line counter 66 also. The line counter 66 is a binary counter for counting the horizontal synchronization detection pulses 18 derived from the actual video signal 12. More specifically, the line counter 66 starts incrementing in response to the first horizontal synchronous signal included in one frame or field, which is derived from the input 18, and resets itself to the initial state in response to the next vertical synchronous signal. The line counter 66 has its output 68 connected to the other input of the comparator 62 and one input of a vertical synchronization (V SYNC GENERATE) counter 80.

The comparator 62 is adapted to compare the count 58 output from the horizontal synchronization counter 52 with the count 68 output from the line counter 66 to deliver the resulting difference to its output 64. In this sense, the comparator 62 plays the role of a subtractor. The output 64 is utilized as a non-standard flag indicative of whether or not the current field or frame is standard, interconnected to an input to the vertical synchronization generation counter 80.

Further, the horizontal synchronization detection pulse 18 output from the synchronization detector 16 is also fed to a binary pixel counter 56. The pixel counter 56 is the same as the pixel counter 20, FIG. 1, except that the former is adapted to count the standard number of pixels expected to constitute a single horizontal line. The pixel counter 56 starts counting pixel clock pulses in response to the horizontal synchronization detection pulse 18. When the number of pixel clock pulses reaches a preselected upper limit, the pixel counter 56 produces a horizontal synchronizing pulse on its output 26 while resetting itself to the initial state. The upper limit is assigned to the pixel counter 56 to be equal to the number of pixels constituting a single horizontal scanning line of standard format, which is included in the input video signal. The pixel counter 56 has its output 26 connected to the input of the comparator 30.

The comparator 30, difference register 36, mean circuit 42, adder 22 and circuitry associated therewith may be of the same configuration as shown in FIG. 1 except that signals are received by the comparator 30 and adder 22 on each horizontal scanning period and the associated circuitry is adapted accordingly. More specifically, the signal input to one input 26 of the comparator 30 is the horizontal synchronizing pulses output from the pixel counter 56 at the standard 1H period whereas the signal input to the other input 18 is horizontal synchronizing pulses in the actual video signal. The comparator 30 therefore produces, line by line, the difference in length of the actual horizontal scanning line from the standard horizontal pulse output from the pixel counter 56. The line-by-line difference is input to the differential register 36 via the output 34 of the comparator 30. The output 34 is additionally used as a non-standard flag indicative of whether or not the number of pixels on one line is the standard number of pixels.

The difference register 36 also temporarily stores a difference on a line-by-line basis. The difference register 36 includes two register circuits although not shown specifically. One register stores m (natural number) differences with the FIFO principle while the other register stores a mean value of the m differences. More specifically, the two registers store differences fed from the comparator 30 during a period of time corresponding to past m lines as counted from the current time. The difference register 36 has a single output 38 connected to the input of the mean circuit 42.

The mean circuit 42 of the illustrative embodiment may be the same as the mean circuit 42 of the previous embodiment except that the former produces a mean value of the m lines of differences. The mean circuit 42 has its output port developing the operational result, i.e. a mean value between lines. The output port 24 is on one hand interconnected to one input of the adder 22 and on the other hand fed back to the input 34 of the difference register 36. To the other input port of the adder 22, the horizontal synchronization detection pulse 18 is fed from the synchronization detector 16.

Also, the adder 22 is adapted to operate on a line-by-line basis. For this aim, the adder 22 is connected to receive the horizontal synchronization detection pulse 18 from the synchronization detector 16. The adder 22 adds the mean value 24 output from the mean circuit 42 to the horizontal synchronization detection pulse 18 or subtracts the former from the latter to develop the result of addition or subtraction from its output 74. In practice, the adder 22 delays or advances the detection pulse 18 by a period of time corresponding to the mean value 24. The output 74 of the adder 22 is interconnected to one input of a selector 76 and the input of the vertical synchronization generating counter 80.

The vertical synchronization generating counter 80 is adapted for receiving the output 64 of the comparator 62 as its control input to select in response either one of the output 68 of the line counter 66 and the output 74 of the adder 22, thereby generating the vertical synchronous signal VD. More specifically, the counter 80 triggered in response to the vertical synchronization detection pulse 32. If the output 64 of the comparator 62 is zero or lies in the allowable range around zero, then the counter 80 selects the output 74 of the adder 22 and counts the adjusted, horizontal synchronous signals HD. When the counter 80 reaches a predetermined count, it produces the vertical synchronous signal VD on its output 14. If the comparator output 64 does not lie in the above allowable range, then the counter 80 selects the output 68 of the line counter 66 and watches its count. When the count is reset to its initial value, the counter 80 produces the vertical synchronous signal VD on its output 14.

The illustrative embodiment of the video signal detecting circuit 50 includes a level detector 86 connected to its device input 12. The level detector 86 is adapted to determine whether or not the level of the luminance signal Y rises above or drops below a preselected range. The thresholds defining the range are so selected that signals having levels that would not be involved with regular video signals can be detected, such as a no-input signal condition in which any signal is not input to the detecting circuit 50 due to, e.g. disconnection, or an excessively high level condition which is caused by disturbance, such as noise. When the level of the luminance signal Y rises above or drops below the above-defined range, the level detector 86 produces a significant detection signal on its output 78. The output 78 of the level detector 86 is connected to a self-running counter 88 on one hand and the other control input of the selector 76 on the other hand.

The self-running counter 88 is adapted for generating a raster signal in response to a pixel clock. The counter 88 has its raster signal output 82 connected to one input of the selector 76. The selector 76, having its control input 78, is adapted to select either one of two inputs 74 and 82 in response to the control signal applied to the control input 78. More specifically, monitoring the output 78 of the level detector 86, the selector 76 selectively connects one of the inputs 74 and 82 to an output terminal 90 in accordance with the signal 78. The video display or similar appliance, not shown, connected as a utility device to the output terminal 90 of the video signal detecting circuit 50 will accordingly display a raster without scene such as a blue back on its display screen when a video signal does not appear on the input terminal 12 or the level of the video signal is extremely low.

Of course, as for an application of the kind not needing the detection of level of the input video signal, the level detector 86, self-running counter 88 and selector 76 are not necessary. In such an application, the output 74 of the comparator 22 will be directly connected to the output 90 of the video signal detecting circuit 50.

Also, the self-running counter 88 may be omitted in an application in which the synchronous signal generated by the horizontal synchronization counter 52 can be used. Specifically, when the counter 88 is absent, the output 78 of the level detector 86 is connected only to the selector 76. In addition, the synchronous signal output of the horizontal synchronization counter 52 is connected to one input of the selector 76, as indicated by a phantom line 92 in FIG. 2. In this modified configuration, the selector 76 selects the output 92 of the horizontal synchronization counter 52 in accordance with the output 78 of the level detector 86.

In operation, when the luminance signal Y arrives at the input terminal 12, the synchronization detector 16 detects a vertical and a horizontal synchronous signal out of the signal Y. The synchronization detector 16 then delivers a vertical synchronization detection pulse to the field decision circuit 70 and vertical synchronization generating counter 80 via its one output 32. At the same time, the synchronization detector 16 also feeds a horizontal synchronization detection pulse to the field decision circuit 70, horizontal synchronization counter 52, pixel counter 56, line counter 66 and comparator 30 via the other output 18.

Figure 3:
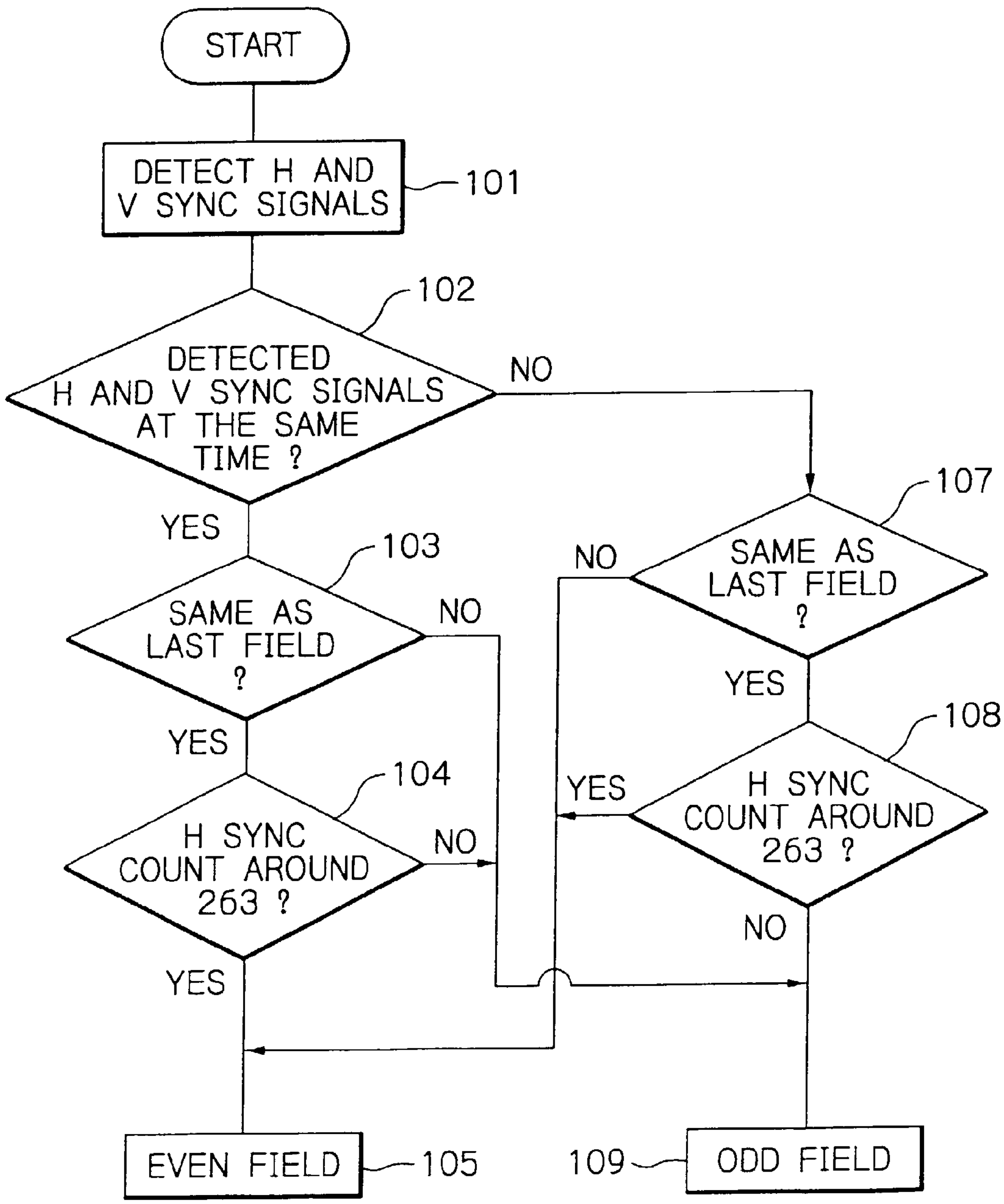
FIG. 3 is a flow chart useful for understanding a specific operation of a field decision circuit included in the embodiment shown in FIG. 2.

Now with reference to FIG. 3, the field decision circuit 70 starts operating in response to the vertical and horizontal synchronous signals received on its inputs 32 and 18, respectively (step 101). In step 102, when the field decision circuit 70 detects the two synchronous signals at the same time, the circuit 70 basically determines that the current field is an odd field. In that case, the circuit 70 then determines whether or not the field detected last time is also an odd field (step 103). If the answer of the step 103 is YES, then the circuit 70 determines whether or not the number of horizontal synchronous signals having been detected is "263" or close to "263" (step 104). If the answer of the step 104 is YES, then the circuit 70 determines that the current field is an even field (step 105). This shows that the first horizontal synchronous signal is shifted by about ½H period relative to the vertical synchronous signal.

In step 104, if the number of horizontal synchronous signals is neither equal nor close to "263", then the field decision circuit 70 basically determines that the current field is an odd field (step 109). In step 103, if the field detected presently is not the same as detected last time, then the circuit 70 also determines that the current field is an odd field (step 109). The system may be adapted such that the counting of the consecutive horizontal synchronous signals is performed within the field decision circuit 70, or alternatively by the decision circuit 70 adapted for monitoring a count established in the line counter 66.

In step 102, when the field decision circuit 70 does not simultaneously detect the horizontal and vertical synchronous signals on its input ports 32 and 18, respectively, the circuit 70 basically determines that the current field is an odd field. In that case, the circuit 70 transfers to step 107 to determine whether or not the field detected last time is also an odd field. If the answer of the step 107 is YES, then the circuit 70 determines whether or not the number of horizontal synchronous signals having been counted is equal or close to "263" (step 108). If the answer of the step 108 is YES, then the circuit 70 determines that the current field is an even field (step 105). If the answer of the step 108 is NO, then the circuit 70 determines that the current field is an odd field (step 109). In step 107, if the answer is NO, then the circuit 70 determines that the current field is an even field (step 105).

As stated above, when the input video signal 12 is based on the interlacing system, the field decision circuit 70 monitors the synchronization detection pulses 32 and 18 output from the synchronization detector 16 to see if the current field is an odd or even field. When the current field is an odd field, the field to arrive next is expected to be an even field. The circuit 70 is therefore designed to select for the first horizontal scanning line a value equal to one-half of the number of horizontal scanning lines that constitute one field of standard format, and for the second and successive scanning lines a value equal to the number of scanning lines constituting a field of standard format to set those values in the horizontal synchronization counter 52 via its output 72 as the previously mentioned upper limit.

On the other hand, when the current field is an even field, the next field to arrive is expected to be an odd field. In this case, the field decision circuit 70 sets in the horizontal synchronization counter 52 the value equal to the number of horizontal scanning lines constituting one field of standard format as the upper limit.

The horizontal synchronization counter 52 starts incrementing, on a standard 1H period basis, in response to the first horizontal synchronous signal in one frame or field obtained from the output 18 of the synchronization detector 16. When the count of the counter 52 reaches the upper limit set in the counter 52 beforehand, it resets itself to its initial state. The count 58 output from the counter 52 is fed to one input of the comparator 62.

The pixel counter 56 starts counting pixel clock pulses also in response to the horizontal synchronization detection pulse 18. When the pixel counter 20 reaches the preselected upper limit, it feeds a horizontal synchronizing pulse to the comparator 30 via its output 26. The pixel counter 20 then resets itself to its initial state and again starts counting pixel clock pulses.

In parallel to this, the line counter 66 starts counting lines in response to the first horizontal synchronous signal of one frame or field received from the output 18 of the synchronization detector 16. The line counter 66 counts the horizontal synchronizing pulses 18 of the actual video signal while delivering the count to the other input of the comparator 62 and the input of the vertical synchronization generating counter 80 via its output 68. The line counter 66 is reset to its initial state by the next vertical synchronization detection pulse 18.

The comparator 62 compares the count received from the line counter 66 via the input 68 with the count received from the horizontal synchronization counter 52 via the input 52. The comparator 62 delivers a difference between the two counts to the vertical synchronization generating counter 80 via the output 64. If the difference 52 is zero or lies in the preselected allowable range around zero, then it indicates that the input video signal 12 has the standard field or the standard frame; if otherwise, the difference 52 is used as a non-standard flag.

Also the input 26 of the other comparator 30 is fed with the horizontal synchronizing pulse which is generated from the pixel counter 56 at the standard 1H period. The comparator 30 calculates a difference of the actual horizontal synchronization detection pulse 18 from the standard horizontal synchronizing pulse 26 output from the pixel counter 56, i.e. the deviation in length of the actual horizontal scanning line. The calculated difference 34 is input to the difference register 36. If the difference 34 is zero or lies in the preselected allowable range around zero, then it indicates that the input video signal 12 has the standard number of pixels for a single line; if otherwise, the difference 34 is used as a non-standard flag.

The difference register 36 stores differences 34 sequentially fed from the comparator 30 for the period of time corresponding to the past m lines as counted from the current time. The mean circuit 42 produces a mean value of the m consecutive lines of differences stored in the difference register 36 and feeds the mean value 24 to the adder 22 and difference register 36. The adder 22 is supplied at its other input with the horizontal synchronization detection pulse 18 from the synchronization detector 16. The adder 22 adds the mean value 24 to the horizontal synchronization detection pulse 18 and then feeds the resulting sum 74 to the vertical synchronization generating counter 80. Consequently, the horizontal synchronization detection pulse 18 is delayed or advanced by a period of time corresponding to the mean value 24.

The vertical synchronization generating counter 80 selects either one of the output 68 of the line counter 66 and the output 74 of the adder 22 in accordance with the output 64 of the comparator 62. More specifically, the counter 80 is triggered by the vertical synchronization detection pulse 32. When the output 64 of the comparator 62 is zero or lies in the allowable range around zero, i.e. the number of lines constituting one field or frame is equal to the standard number of lines, the counter 80 selects the output 74 of the adder 22 and counts the horizontal synchronous signals HD adjusted by the mean value 24. When the counter 80 reaches a preselected count, it produces the vertical synchronous signal VD on its output 14.

On the other hand, when the output 64 of the comparator 62 does not lie in the allowable range, i.e. the number of lines constituting one field or frame is different from the standard number of lines, the vertical synchronization generating counter 80 selects the output 68 of the line counter 66 and monitors the count. As soon as the count represented by the output 68 is reset to the initial state, the counter 80 produces the vertical synchronous signal VD on its output 14.

The level detector 86 watches the level of the luminance signal Y applied to the input 12 to see if it rises above or falls below the preselected range or not. So long as the level of the luminance signal Y drops to zero or becomes unusually high, the level detector 86 maintains its output 78 insignificant. The selector 76 therefore selects the horizontal synchronous signal 74 output from the adder 22. Consequently, the horizontal synchronous signal HD delayed or advanced by the adder 22 appears on the output 90 of the detecting circuit 50.

When the level detector 86 detects the absence of the luminance signal Y ascribable to, e.g., disconnection or an unusually high level ascribable to a disturbance such as noise, the level detector 86 brings its output 78 to its significant level. In response, the self-running counter 88 starts counting the pixel clock pulses and generates a raster signal. At the same time, the selector 76 selects the output 82 of the self-running counter 88 in response to the significant output 78 of the level detector 86 and transfers it to its output 90. This allows the video display, not shown, connected to the output 90 to display, e.g., a blue back raster on its screen in response to the raster signal 82. The illustrative embodiment thus enables the no-input signal and noisy conditions to be determined separately from the irregular synchronous signal condition.

As stated above, even when the input video signal meets the standard as to the number of horizontal synchronous signals, but not as to the number of pixels for a single line, the illustrative embodiment can generate vertical synchronous signals at an adequate period. Moreover, the illustrative embodiment can adjust the number of pixels in accordance with the variation in number of pixels on the individual lines. This cannot be accomplished by simply counting horizontal synchronous signals in order to generate vertical synchronous signals.

In summary, it will be seen that the present invention provides a video signal detecting circuit capable of generating vertical synchronous signals at adequate timing even when an input video signal has the number of pixels for a single picture different from the standard number.

The entire disclosure of Japanese patent application No. 2001-378264 filed on Dec. 12, 2001, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A video signal detecting circuit comprising:

a synchronization detector for detecting a vertical synchronous signal in an input video signal;

a counter for counting pixel clock pulses in response to each of the detected vertical synchronous signals, and producing a first signal when a count of the pixel clock pulses reaches a predetermined number;

a comparator for comparing the detected vertical synchronous signal with the first signal, and outputting a second signal representative of a difference between the detected vertical synchronous signal and the first signal;

a mean circuit for averaging the second signals over a plurality of pictures of the input video signals, and producing a mean value resultant from averaging; and an adjusting circuit for adjusting the detected vertical synchronous signal with the mean value, and outputting a resulting adjusted signal as a vertical synchronous signal;

the predetermined number being substantially equal to a standard number of pixels included in a single picture.

2. The video signal detecting circuit in accordance with claim 1, said mean circuit comprising:

a register for storing the second signals in a first-in first-out fashion; and an averaging circuit for averaging the second signals stored in said register over the plurality of pictures to produce the mean value.

3. A video signal detecting circuit comprising:

a synchronization detector for detecting a vertical synchronous signal and a horizontal synchronous signal in an input video signal;

a first counter for starting incrementing in response to the vertical synchronous signal detected while outputting a first signal representative of an incrementing value, and stopping incrementing when the incrementing value reaches a first predetermined value;

a second counter for starting incrementing in response to the horizontal synchronous signal following the vertical synchronous signal detected, and counting the detected horizontal synchronous signals to output a second signal representative of a count;

a first comparator for comparing the second signal with the first signal for outputting a third signal representative of a resulting difference between the second and first signals;

a third counter for start counting pixel clock pulses in response to each of the horizontal synchronous signals detected, and outputting a fourth signal when a count reaches a second predetermined value;

a second comparator for comparing the horizontal synchronous signal detected with the fourth signal for outputting a fifth signal representative of a resulting difference between the horizontal synchronous signal detected and the fourth signal;

a mean circuit for averaging the fifth signals over a plurality of lines of the input video signal to produce a mean value resultant from averaging; and an adjusting circuit for adjusting the detected horizontal synchronous signal with the mean value for outputting a resulting adjusted signal as a horizontal synchronous signal;

the first predetermined value and the second predetermined value being respectively substantially equal to a standard number of lines included in a single picture and a standard number of pixels included in a single line.

4. The video signal detecting circuit in accordance with claim 3, further comprising:

a level detector for determining whether or not a level of the input video signal lies in a predetermined range; and an output circuit for outputting a sixth signal that forms a raster screen, when said level detector determines that the level does not lie in the predetermined range.

5. The video signal detecting circuit in accordance with claim 4, said output circuit comprising:

a self-running counter operative in response to said level detector for outputting the sixth signal; and a selector operative in response to said level detector for selecting either one of the resulting adjusted signal output from said adjusting circuit and the sixth signal.

6. The video signal detecting circuit in accordance with claim 3, further comprising:

a level detector for determining whether or not a level of the input video signal lies in a predetermined range; and an output circuit for outputting a signal output from said first counter as a sixth signal that forms a raster screen, when said level detector determines that the level does not lie in the predetermined range.

7. The video signal detecting circuit in accordance with claim 6, said output circuit comprising a selector operative in response to said level detector for selecting either one of the resulting adjusted signal output from said adjusting circuit and the sixth signal.

8. The video signal detecting circuit in accordance with claim 3, wherein the input video signal represents a frame formed with an odd field and an even field interlaced with each other;

said video signal detecting circuit further comprising a field decision circuit for receiving the horizontal and vertical synchronous signals detected for determining whether a current field is the odd field or the even field;

said field decision circuit setting in said first counter as the first predetermined value, when said field decision circuit determines the current field as the odd field, a value equal to a number of horizontal scanning lines included in one field of a standard format, and when said field decision circuit determines the current field as the even field, a value equal to one-half of the number of scanning lines included in one field of the standard format for a first horizontal scanning line and another value equal to the number of field scanning lines of the standard format for a second and successive horizontal scanning lines.

9. The video signal detecting circuit in accordance with claim 3, said mean circuit comprising:

a register for storing the fifth signals in a first-in first-out fashion; and an averaging circuit for averaging the fifth signals stored in said register over the plurality of pictures to produce the mean value.

* * * * *